Figure 1:
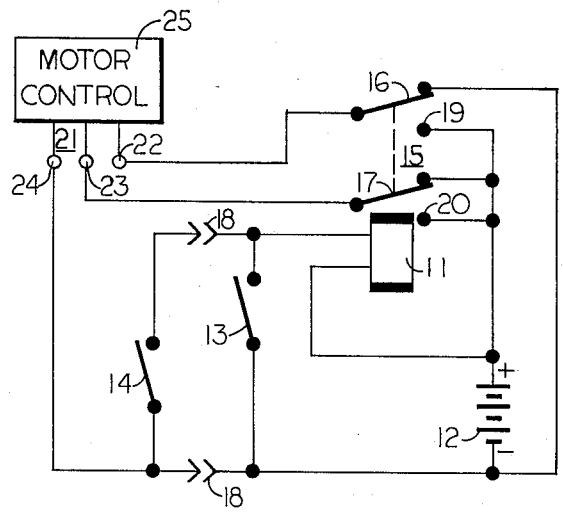

June 23, 1964     I. JACOBSON     3,138,080

CAMERA CONTROL ATTACHMENT

Filed June 10, 1963     2 Sheets-Sheet 1

*INVENTOR.*
IRVING JACOBSON
BY Edward A. Sokolski
ATTORNEY

June 23, 1964  I. JACOBSON  3,138,080
CAMERA CONTROL ATTACHMENT
Filed June 10, 1963  2 Sheets-Sheet 2

INVENTOR.
IRVING JACOBSON
BY
Edward A. Sokolski
ATTORNEY

United States Patent Office 3,138,080
Patented June 23, 1964

3,138,080
CAMERA CONTROL ATTACHMENT
Irving Jacobson, 862 N. Vine St., Hollywood, Calif.
Filed June 10, 1963, Ser. No. 286,815
12 Claims. (Cl. 95—31)

This invention relates to a camera control attachment and more particularly to such a device used to advance the film in a still camera which is integrally joined to such a camera.

Motor driven film advance mechanisms are provided in certain still cameras to permit the taking of a number of pictures in quick succession and to enable the control of the camera from a remote location. Such a device has especial utility in press photography and photographic instrumentation where rapid fire photographing is called for and in the taking of unusual shots which may require remote control of the camera. Most such devices utilize an electrically driven motor which operates off a battery supply and which is controlled by a relay device. In the devices of the prior art, the power and control circuitry is housed in a separate unit apart from the camera which is connected thereto by means of a cable. Such units have the disadvantage of adding to the loose equipment that must be separately carried along with the camera and could readily be misplaced and therefore unavailable when needed most. In addition such units are generally cumbersome and tend to detract from the facility of utilization of the film advance device.

The device of this invention overcomes the shortcomings of prior art devices in providing a film advance control attachment which is normally integrally joined to the camera and yet which may be readily detached therefrom if so desired.

The control attachment is joined to the bottom of the camera and provides a solid base therefor. The attachment is so formed as to leave the camera "open-close" knob accessible so that the back of the camera may be removed for putting new film therein without removing the control attachment. The control attachment includes casing means in which the power supply batteries are contained. In addition, this casing means also holds a control relay and a micro-switch for control of the film advance mechanism.

The control attachment is joined to the bottom of the camera by means of a screw which mates with the tripod attachment in the base of the camera. The control attachment has a plug with three contacts for power and control purposes. This plug mates with a corresponding receptacle in the camera which runs to the motor control. The device of this invention thus integrates the control means for the film advance mechanism with the camera in a compact well located unit.

It is therefore an object of this invention to provide a control device for a camera film advance mechanism which is integrated with the camera.

It is a further object of this invention to facilitate the control of a camera film advance mechanism.

It is another object of this invention to provide an improved control for a film advance mechanism.

Figure 2:
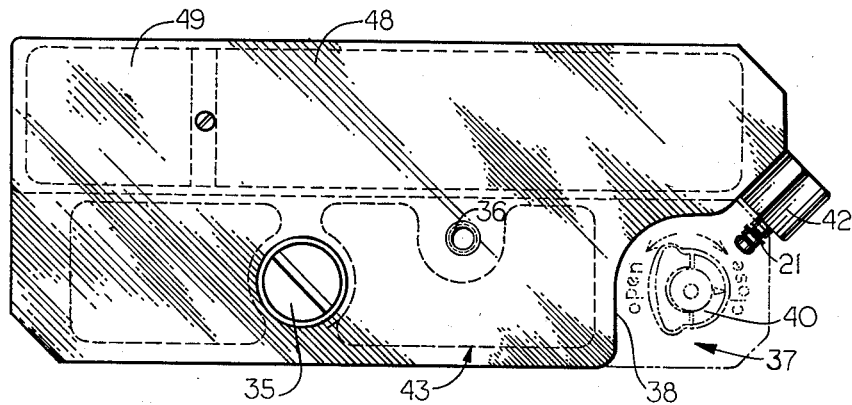
Figure 3:
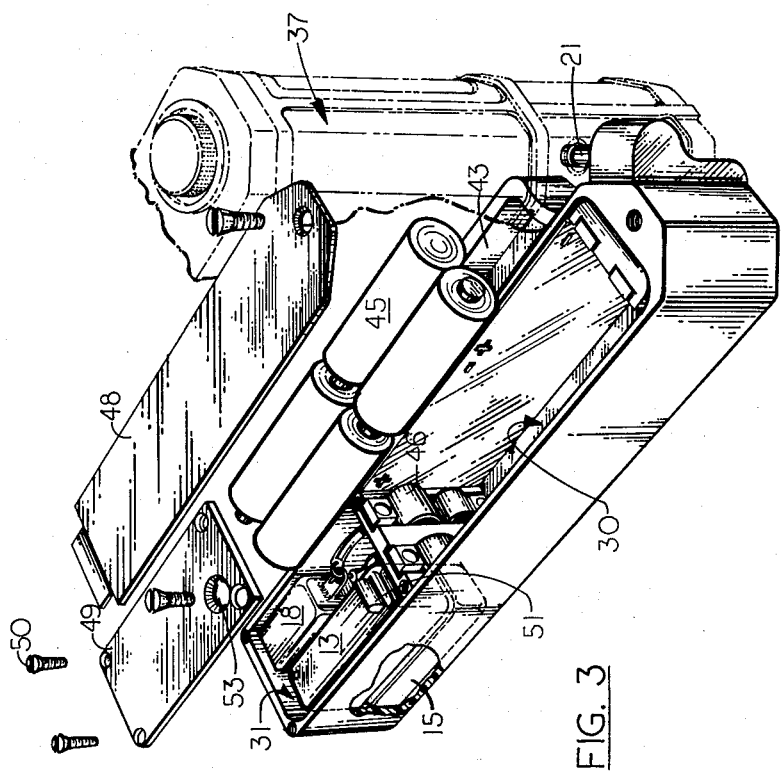

Other objects of this invention will become apparent from the following description taken in connection with the accompanying drawings of which FIG. 1 is a schematic drawing showing control circuitry which may be used in the device of the invention, FIG. 2 is a bottom view of the device of the invention as attached to a camera, and FIG. 3 is an exploded perspective view of the device of the invention as attached to a camera.

Referring now to FIG. 1, a schematic diagram of a control circuit which may be utilized with the device of the invention is shown. The positive terminal of battery 12 is connected to one end of relay coil 11, the other end of this coil being connected to a terminal of micro-switch 13 and remote control switch 14. Remote control switch 14 may be located at a remote location and as can be seen, is connected in parallel with micro-switch 13 through receptacle 18 by means of an appropriate cable. When either switch 13 or 14 is closed, relay coil 11 is actuated by the current fed therefrom from battery 12, and contact arms 16 and 17 are drawn downward so that they contact terminals 19 and 20 respectively. This connects the positive terminal of battery 12 to terminal 22 on connector 21 through contact arm 16 and also connects this same positive terminal to terminal 23 through contact arm 17. With the actuation of relay 11, a control signal is provided at terminal 22 which actuates a switching mechanism in motor control 25 which advances the film in the camera precisely the amount necessary for a succeeding exposure. Such advance is provided each time either switch 13 or 14 is closed and released. The motor drive signal is provided at terminal 23 with terminal 24 providing the negative return for both the motor drive signal and the control signal. The motor control in the camera, as is well known in the art, may comprise a relay operating in conjunction with a ratchet mechanism which provides motor current until the film has advanced the predetermined desired amount.

Referring now to FIGS. 2 and 3, a preferred embodiment of the device of the invention is illustrated. The control attachment is joined to the bottom of the camera by means of screw 35 which engages the threaded portion at the bottom of the camera normally utilized for attaching the camera to a tripod. The head of screw 35 recesses into the base of the control attachment so that such base has no projections extending therefrom. The control attachment thus effectively provides a solid support base for the camera. Threaded portion 36 is provided at the bottom of the control attachment for connecting the camera through the control attachment to a tripod if so desired. One corner of the attachment has a recess 38 formed therein leaving the "open-close" knob 40 of the camera exposed so that it is readily accessible. The back of the camera can therefore be removed to replace film without removing the control attachment. A housing 42 is formed at this end of the attachment to provide a support for plug 21 which joins with a mating receptacle in the camera. The three wire leads which run to plug 21 extend through a channel in the bottom of the attachment (not shown) and hence go through housing 42 to plug 21.

The attachment has a first compartment 30 in which dry cells 45 are contained. These cells are connected to each other and held in place by means of spring clips 46. Contained within a second compartment 31 are micro-switch 13, remote control receptacle 18, and relay 15. Micro-switch 13, relay 15, dry cells 45, and output plug 21 are interconnected as illustrated in FIG. 1 with plug 21 connecting to a mating receptacle in camera 37 as already indicated. Cover plates 48 and 49 are utilized to cover compartments 30 and 31 respectively and are held in place by means of screws 50. The actuator 51 for micro-switch 13 protrudes through aperture 53 formed in cover plate 49.

Camera 37 rests on lip portion 43 of the control attachment which forms a ledge and is joined to this lip portion by means of screw 35 which protrudes through an aperture (not shown) in lip portion 43 and engages the threaded tripod attachment (not shown) in the bottom of the camera.

The film advance mechanism is operated by momentary actuation of the actuator 51 of micro-switch 13 or by momentary actuation of the remote control switch 14 (see FIG. 1). This causes power to be fed to the motor control 25 in the camera which provides a predetermined motor drive signal for effecting the desired film advance.

The device of this invention thus is a compact and simple control attachment for a camera which provides control for a film advance mechanism. The attachment is integrally joined with the camera and requires no hanging wire leads or other loose accessories. Film may be loaded without removing the attachment, the base of the camera remaining connected to the attachment while the rest of the camera is removed therefrom for inserting the film. The device of this invention thus greatly facilitates the utilization of cameras having motor driven film advance mechanisms.

While the invention has been described and illustrated in detail, it is to be clearly understood that this is intended by way of illustration and example only, and is not to be taken by way of limitation, the spirit and scope of this invention being limited only by the terms of the following claims.

I claim:

1. In a camera control attachment suitable for connection to a tripod attachment on the base of a camera,
    a plurality of dry cells,
    relay means,
    switch means,
    compartment means for containing said relay means and said switch means,
    connector means mounted on the outer wall of said compartment means for providing electrical connections from said control attachment to said camera,
    means for interconnecting said switch means, said relay means, said dry cells and said connector means,
    ledge means extending from said compartment means for supporting said camera, said ledge means having an aperture in the bottom portion thereof, the bottom portions of said compartments and said ledge means forming a broad substantially flat surface, and
    means for detachably joining said camera to said ledge means.

2. The device as recited in claim 1 wherein said ledge means has a recess formed at one end thereof, said recess being adapted to provide access to the back opening control knob of said camera.

3. The device as recited in claim 2 wherein said connector means comprises a plug, said plug extending towards the recess formed in said ledge means.

4. In a camera control attachment suitable for connection to a tripod attachment on the base of a camera,
    a plurality of dry cells,
    first compartment means for containing said dry cells,
    relay means,
    switch means,
    second compartment means adjacent to said first compartment means for containing said relay means and said switch means,
    connector means mounted on the outer wall of one of said compartment means for providing electrical connections from said control attachment to said camera,
    means for electrically interconnecting said switch means, said relay means, said dry cells and said connector means,
    ledge means extending from said compartment means for supporting said camera, said ledge means having an aperture in the bottom portion thereof, the bottom portions of said compartments and said ledge means forming a broad substantially flat surface, and
    means for joining said camera to said ledge means, said means for joining comprising a screw running through the aperture in said ledge means and engaging the tripod attachment of said camera, the head of said screw being recessed into the bottom portion of said ledge means.

5. The device as recited in claim 4 wherein said ledge means has a second aperture in the bottom portion thereof, said second aperture being threaded.

6. A camera control attachment for controlling the film advance of a camera, said camera having a motor driven film advance mechanism, said attachment comprising,
    a first compartment,
    a plurality of dry cells contained within said first compartment,
    a second compartment adjacent said first compartment,
    a relay,
    a switch,
    said relay and switch being contained within said second compartment,
    ledge means for supporting said camera extending from said compartments, said ledge means having a recess formed at one end thereof and an aperture formed near the center thereof,
    a plug extending from the outer wall of one of said compartments towards the recessed portion of said lip means,
    means for electrically interconnecting said plug, said relay, said switch, and said dry cells, and
    screw means for attaching said control attachment to said camera, said camera having a threaded aperture in the bottom thereof, said screw means running through said aperture formed in said ledge means and engaging said threaded aperture.

7. The device as recited in claim 6 wherein the bottom portions of said compartments and said ledge means form a substantially continuous flat surface.

8. The device as recited in claim 7 wherein said screw means comprises a screw, the head of said screw being recessed into said flat surface.

9. In combination,
    a camera having a motor driven film advance mechanism and an electrical input receptacle for said mechanism, said camera further having a threaded aperture in the bottom thereof for connecting the camera to a stand, and a control knob at one corner of the bottom thereof for opening said camera; and
    a control attachment for controlling said film advance mechanism, said control attachment comprising,
    a first compartment,
    dry cells contained within said first compartment,
    a second compartment adjacent said first compartment,
    a relay,
    a switch,
    said relay and switch being contained within said second compartment,
    separate cover means for covering said first and second compartments,
    a lip portion extending from said first and second compartments, said lip portion having an aperture near the center of the bottom thereof, a recess being formed in said lip portion at one end thereof, said recess exposing said camera control knob,
    a plug mounted on an external wall of said first compartment and extending towards said recess formed in said lip portion,
    means for electrically interconnecting said dry cells, said relay, said switch and said plug, and
    screw means for connecting said control attachment to said camera with said plug in mating engagement with the input receptacle for the film advance mechanism in said camera said screw means comprising an attachment screw running through the aperture in said lip portion and engaging the threaded aperture in the bottom of said camera.

10. The device as recited in claim 9 wherein the bottom portions of said compartments and said lip portions form a substantially continuous broad flat surface, the head of said attachment screw being recessed into said surface.

11. The device as recited in claim 9 wherein said lip portion has a second aperture in the bottom thereof, said second aperture being threaded.

12. The device as recited in claim 9 wherein the cover means for said second compartment has an aperture therein, said switch having an actuator button which protrudes through said aperture in said cover means.

References Cited in the file of this patent

UNITED STATES PATENTS

| | | |
|---|---|---|
| 2,295,071 | Ansley | Sept. 8, 1942 |
| 2,677,998 | Schwartz et al. | Nov. 11, 1954 |
| 2,769,380 | Rapaport | Nov. 6, 1956 |
| 2,783,696 | Sewig | Mar. 5, 1957 |
| 2,811,907 | Hyzer | Nov. 5, 1957 |